United States Patent [19]
Thompson et al.

[11] Patent Number: 5,768,266
[45] Date of Patent: Jun. 16, 1998

[54] HANDSET SIGNALLING TIME SLOT ASSIGNMENT PLAN FOR SATELLITE MOBILE COMMUNICATION

[75] Inventors: James D. Thompson, Manhattan Beach, Calif.; Mohammad Soleimani, Rockville, Md.; Jeffrey E. Outwater, Agoura Hills, Calif.

[73] Assignee: Hughes Electronics, Los Angeles, Calif.

[21] Appl. No.: 603,948

[22] Filed: Feb. 16, 1996

[51] Int. Cl.$^6$ .......................... H04B 10/105; H04J 3/12
[52] U.S. Cl. .......................... 370/321; 370/347; 370/522
[58] Field of Search .......................... 370/321, 319, 370/316, 326, 322, 323, 324, 347, 348, 345, 478, 498, 337, 336, 330, 329, 328, 501, 522

[56] References Cited

PUBLICATIONS

R. Steele, "Mobile Radio Communications," IEEE Press, pp. 77–79, 1992.

*Primary Examiner*—Douglas W. Olms
*Assistant Examiner*—Matthew C. Phillips
*Attorney, Agent, or Firm*—Terje Gudmestad; Elizabeth E. Leitereg; W. K. Denson-Low

[57] ABSTRACT

A mobile, satellite-based communication system includes a defined signaling arrangement developed from an analysis of factors including movement of the mobile terminals, movement of the satellite, beam discrepancies and duration of the call to the mobile terminal to set up a frame assignment plan for time division multiple access (TDMA) carriers and identifying permissible frame offset which can be accommodated throughout the entire transmission. As a result, timing and frequency references from a mobile to mobile command (MMC) may be provided from a reference source along with receive and transmit data communications without losing the command signals or the communication information and providing highly efficient use of each carriers time slots for receiving transmitting communication signals. Similarly, the signaling arrangement permits an efficient frame structure and a time slot assignment plan that does not require enhanced equipment at the mobile terminal. Moreover, the signaling frame assignment is applicable to multibeam satellite-based mobile communication systems for use with communications between mobile terminals and gateways as well as between mobile terminals.

21 Claims, 15 Drawing Sheets

| Parameter | Equation | INCL. (+/- 5.2) | BEAM (+/- 0.345) |
|---|---|---|---|
| El angle | E0 | 20 | 25.8061 |
| Latitude (nom) | p0=acos(cos(E0)/d/r)-E0 | 61.8283 | 56.3672 |
| S/C angle | a0=90-p0-E0 | 8.1717 | 07.8267 |
| L(nom)-L(subsat) | L0=d*sin(p0)/cos(E0)-d+r | 3768.57 | 3208.78 |
| t-t(subsat) msec | t0=L0/299792.5 | 12.5706 | 10.7033 |
| | | | |
| Delta S/C angle | b1=+beamwidth/2 | - | 0.3450 |
| S/C angle | a1=a0+b1 | - | 8.1717 |
| delta latitude(+) | +t1 | 5.2000 | - |
| Latitude (max) | p1=p0+t1 or p1=f(a1) | 67.0283 | 61.82837 |
| El angle | E1=atan((cos(p1)-.1515)/sin(p1) | 14.5528 | 20.0000 |
| L(max)-L(subsat) | L1=d*sin(p1)/cos(E1)-d+r | 4321.129 | 3768.574 |
| t(max)-t(subsat) | t1=L1/299792.5 | 14.41 | 12.57 |
| | | | |
| Delta S/C angle | b1=beamwidth/2 | - | -0.345 |
| S/C angle | a1=a0+b1 | - | 7.4817 |
| delta latitude(-) | -t1 | -05.2000 | - |
| | | | |
| Latitude (min) | p2=p0-t1 or p2=f(a2) | 56.6283 | 51.9270 |
| El angle | E2=atan((cos(p2)-.1515)/sin(p2) | 25.5265 | 30.5913 |
| L(min)-L(subsat) | L2=d*sin(p2)/cos(E)-d+r | 3234.975 | 2773.267 |
| t(min)-t(subsat) | t2=L2/299792.5 | 10.79 | 9.25 |
| | | | |
| delta t msec | delta t=t1-t2 | 03.6230 | 3.3200 |
| Rel. offset over day | offset= 2*delta t | 7.2460 | - |
| Rel. offset over beam | offset=1.2*2*(t1-t2) * | - | 7.9680 |

*Fig. 3*

| Parameter | Equation | Value |
|---|---|---|
| El angle | E0 | 20 |
| Latitude (nom) | p0=acos(cos(E0)/d/r)-E0 | 61.8283 |
| S/C angle | a0=90-p0-E0 | 8.1717 |
| L(nom)-L(subsat) | L0=d*sin(p0)/cos(E0)-d+r | 3768.571 |
| t-t(subsat) msec | t0=L0/299792.5 | 12.5706 |
| | | |
| Speed | v1(km/hr) | 100 |
| Duration | t1 (min) | 30 |
| Distance | d1(km)=v1*t1/60 | 50 |
| Delta lat.(deg) | w1=57.3*d1/r | .4492 |
| New lat. | p1=p0-w1 | 61.3792 |
| | | |
| New El. | E1=atan((cos(p1)-.1515)/sin(p1) | 20.4742 |
| New L(nom)-L(ss) | L1=d*sin(p1)/cos(E1)-d+r | 3721.657 |
| t-t(ss) msec | t1=L1/299792.5 | 12.4141 |
| | | |
| offset (msec) | offset=2*(t0-t1) | .3130 |

| Frame offset (slots) | R = 1 | | | | R = 2 | | | | R = 3 | | | | R = 4 | | | | R = 5 | | | | R = 6 | | | | |
|---|---|---|---|---|---|---|---|---|---|---|---|---|---|---|---|---|---|---|---|---|---|---|---|---|---|
| 0 | 3 | 4 | 5 | 6 | 4 | 5 | 6 | | | 5 | 6 | | | 1 | 2 | 6 | | 1 | 2 | 3 | | 1 | 2 | 3 | 4 |
| 0.33 | 3 | 4 | 5 | 6 | 4 | 5 | 6 | | | 5 | 6 | | | 1 | 2 | 6 | | 1 | 2 | 3 | | 1 | 2 | 3 | 4 |
| 0.66 | 2 | 3 | 4 | 5 | 3 | 4 | 5 | | | 4 | 5 | | | 1 | 2 | 5 | | 1 | 2 | 3 | | 1 | 2 | 3 | 3 |
| 1 | 2 | 3 | 4 | 5 | 3 | 4 | 5 | | | 4 | 5 | | | 1 | 1 | 5 | | 1 | 1 | 2 | | 1 | 1 | 2 | 3 |
| 1.33 | 2 | 3 | 4 | 4 | 2 | 3 | 4 | | | 3 | 4 | | | 1 | 1 | 4 | | 1 | 1 | 2 | | 1 | 1 | 2 | 3 |
| 1.66 | 1 | 2 | 3 | 4 | 2 | 3 | 4 | | | 3 | 4 | | | 0 | 1 | 4 | | 0 | 1 | 2 | | 0 | 1 | 2 | 3 |
| 2 | 1 | 2 | 3 | 4 | 2 | 3 | 4 | | | 3 | 3 | | | 0 | 1 | 3 | | 0 | 1 | 2 | | 0 | 1 | 2 | 2 |
| 2.33 | 1 | 2 | 2 | 3 | 1 | 2 | 3 | | | 2 | 3 | | | 0 | 0 | 3 | | 0 | 0 | 1 | | 0 | 0 | 1 | 2 |
| 2.66 | 0 | 1 | 2 | 3 | 1 | 2 | 3 | | | 2 | 3 | | | 7 | 0 | 2 | | 7 | 0 | 1 | | 7 | 0 | 1 | 2 |
| 3 | 0 | 1 | 2 | 3 | 1 | 2 | 3 | | | 2 | 2 | | | 7 | 0 | 2 | | 7 | 0 | 1 | | 7 | 0 | 1 | 1 |
| 3.33 | 0 | 1 | 1 | 2 | 0 | 1 | 2 | | | 1 | 2 | | | 7 | 7 | 1 | | 7 | 7 | 0 | | 7 | 7 | 0 | 1 |
| 3.66 | 7 | 0 | 1 | 2 | 0 | 1 | 2 | | | 1 | 2 | | | 6 | 7 | 1 | | 6 | 7 | 0 | | 6 | 7 | 0 | 1 |
| 4 | 7 | 0 | 1 | 2 | 0 | 1 | 2 | | | 1 | 1 | | | 6 | 7 | 0 | | 6 | 7 | 0 | | 6 | 7 | 0 | 0 |
| 4.33 | 7 | 0 | 0 | 1 | 7 | 0 | 1 | | | 0 | 1 | | | 6 | 6 | 0 | | 6 | 6 | 7 | | 6 | 6 | 7 | 0 |
| 4.66 | 6 | 7 | 0 | 1 | 7 | 0 | 1 | | | 0 | 1 | | | 5 | 6 | 0 | | 5 | 6 | 7 | | 5 | 6 | 7 | 0 |
| 5 | 6 | 7 | 0 | 1 | 7 | 0 | 1 | | | 0 | 0 | | | 5 | 6 | 7 | | 5 | 6 | 7 | | 5 | 6 | 7 | 7 |
| 5.33 | 6 | 7 | 7 | 0 | 6 | 7 | 0 | | | 7 | 0 | | | 5 | 5 | 7 | | 5 | 5 | 6 | | 5 | 5 | 6 | 7 |
| 5.66 | 5 | 6 | 7 | 0 | 6 | 7 | 0 | | | 7 | 0 | | | 4 | 5 | 7 | | 4 | 5 | 6 | | 4 | 5 | 6 | 7 |
| 6 | 5 | 6 | 7 | 0 | 6 | 7 | 0 | | | 7 | 7 | | | 4 | 5 | 6 | | 4 | 5 | 6 | | 4 | 5 | 6 | 6 |
| 6.33 | 5 | 6 | 6 | 7 | 5 | 6 | 7 | | | 6 | 7 | | | 4 | 4 | 6 | | 4 | 4 | 5 | | 4 | 4 | 5 | 6 |
| 6.66 | 4 | 5 | 6 | 7 | 5 | 6 | 7 | | | 6 | 7 | | | 3 | 4 | 6 | | 3 | 4 | 5 | | 3 | 4 | 5 | 6 |
| 7 | 4 | 5 | 6 | 7 | 5 | 6 | 7 | | | 6 | 6 | | | 3 | 4 | 5 | | 3 | 4 | 5 | | 3 | 4 | 5 | 5 |
| 7.33 | 4 | 5 | 5 | 6 | 4 | 5 | 6 | | | 5 | 6 | | | 3 | 3 | 5 | | 3 | 3 | 4 | | 3 | 3 | 4 | 5 |
| 7.66 | 3 | 4 | 5 | 6 | 4 | 5 | 6 | | | 5 | 6 | | | 2 | 3 | 5 | | 2 | 3 | 4 | | 2 | 3 | 4 | 5 |
| 8 | 3 | 4 | 5 | 6 | 4 | 5 | 6 | | | 5 | 5 | | | 2 | 3 | 4 | | 2 | 3 | 4 | | 2 | 3 | 4 | 4 |

|  |  | Guard time size (slots) | | | | |
| --- | --- | --- | --- | --- | --- | --- |
|  |  | (0/3) | (1/3) | (1/2) | (2/3) | (3/3) |
| MMC SIZE (slots) | (1/3) | N=2 Es=100 Eb=100 Ed=100 | N=2 Es=100 Eb=100 Ed<100 | N=3 Es=100 Eb=100 Ed=100 | N=3 Es=100 Eb=100 Ed=100 | N=4 Es=100 Eb=100 Ed=100 |
|  | (2/3) | - - - - | - - - - | N=3 Es=100 Eb=100 Ed=100 | N=4 Es=100 Eb=100 Ed=100 | - - - - |

*Fig. 10*

|  |  | Guard time size (slots) | | | | |
| --- | --- | --- | --- | --- | --- | --- |
|  |  | (0/3) | (1/3) | (1/2) | (2/3) | (3/3) |
| MMC SIZE (slots) | (1/3) | 2 | 2 | 3 | 3 | 4 |
|  | (2/3) | - | - | 6 | 8 | - |

HANDSET SIGNALLING TIME SLOT ASSIGNMENT PLAN FOR SATELLITE MOBILE COMMUNICATION

TECHNICAL FIELD

The present invention relates to satellite communication systems with time division multiple access (TDMA) carriers having a series of framed time slots to which voice channels are assigned and to the assignment of mobile-to-mobile communication slots such as receive slots, transmit slots, and control signal channel slots within the frame.

BACKGROUND ART

Many previously known communication systems are ground based systems that avoid the limitations of hardwired public switched telephone networks by transmitting electromagnetic radiation signals. Previously known cellular telephone systems use ground based antennas or towers to relay signals to and from communication terminals, such as computers, facsimile machines or handsets within service areas called cells. The cells are limited by geographic or physical limitations within a short distance of the antenna, and communications must be sequentially transmitted between towers when communications terminals are separated by great distances.

An increased coverage area has been provided by using orbiting satellites to direct signals to expanded geographic areas served by signal beams carrying a number of carrier signals. However, the communications between communication terminals passes from one terminal to the satellite and returns through one or more land-based gateways that controls the transmission and reception communication signals to the other participating terminal. Each link or hop between the terminal, satellite, gateway and terminal introduces delay and requires power to relay the communication signals. Moreover, when the terminals are mobile (MT), the recovery of power usage and simplification of the equipment are important to cost effective and practical implementation.

One known form of mobile terminal comprises a handset. Since these handsets are to be purchased by users, and since the number of mobile terminals is the largest equipment supply in the system, it is important to reduce the costs and power requirements for the handsets. Accordingly, the handset preferably includes a transmit/receive (T/R) switch as opposed to the heavier or costlier diplexer filters. However, unless the handset is provided with an accurate frequency reference source to remain synchronized with the transmit and receive channel assignment commanded via satellite from the primary gateway, communication signal will be lost. The bulk and cost of including an autonomous and accurate frequency/timing source at each mobile terminal is prohibitive, and is particularly impractical for a handset mobile terminal. Therefore, the handset preferably includes a relatively simple frequency/timing source requiring frequency/timing assistance from the primary gateway through the satellite.

For gateway to mobile terminal (GW-MT) communications, this gateway assistance is provided initially via a broadcast control channel (BCC) at the start of a call, and later during the call that gateway provides frequency and timing updates via overhead bits attached to the communication signal. These control channels provide signals for call waiting, short message service, and functions for call teardown such as terminating a call upon disconnect at one mobile terminal and sending a signal from the system upon disconnect of one terminal to reset the terminal to standby. This same approach would be used for MT-MT calls if all MT-MT calls were routed through a gateway (GW-MT) Unfortunately, the passage of communications through the gateways introduces excessive delays due to the multiple hops. Such delays are not acceptable for voice communications between handsets, although they are tolerable in transmissions between facsimile machines and computer terminals.

If an alternative to GW-MT is desired, several factors exist that do not enable an additional control signals to be readily employed. For example, three handset functions of receiving information, transmitting information and receiving controls render portions of the frame unusable. This is referred to as a loss of frame efficiency. In addition to mutual blockage of these three functions, many other factors complicate this situation. The arrangement of the frame structure may not permit efficient transfer of all this information on the carrier, particularly where a loss of the data may be caused by timing differences due to a mobile terminal's position within the coverage, the beam's position within the coverage, the mobile terminals position within the beam, and any errors in beam pointing, such as thrusters adjusting satellite position and beam identification errors. In addition, the inclined orbit of the satellite, movement of the mobile terminal during the call, movement of the satellite during the call, and the length of the call over which these changes occur, can also affect the reception of control signals and transmission and reception of information signals. In addition, low cost handset operation will not permit a substantial reduction in mobile terminal retune time and the time to switch between the transmit and receive functions, if costs are to be kept down and the loss of information transmitted during the switching period cannot be tolerated.

SUMMARY OF THE INVENTION

The present invention overcomes the disadvantages mentioned above by providing a system of aligned time slot assignment with time division multiple access (TDMA) frame carriers that use simple cost-effective handsets in single hop communications between mobile terminals through a satellite link without degradation in frame utilization efficiency. The cost-effective handsets use a relatively simple mobile terminal control signal (MMC) as a frequency and timing references and require only digital signal processing (DSP) improvement to accommodate the additional processing capability. Correction signals are provided to the terminals, for example, handsets, via satellite from a primary gateway. The correction signals are on a MMC carrier independent of the mobile-to-mobile communication signals, thus avoiding the need for double hop transmission and its attendant signal delay that is undesirable for voice communications. These MMC channels preferably provide signals for call waiting, short message service, and functions for call teardown such as terminating a call upon disconnect at one mobile terminal and sending a signal from the system upon disconnect of one terminal to reset the terminal to standby. A primary gateway listens to the receive and transmit signal on other receive and transmit carriers to generate the frequency and timing corrections necessary for delivery on the MMC carrier.

The assignment according to the present invention provides a frame structure that permits the handset to receive the correction signal in a portion of the TDMA frame when it is neither transmitting nor receiving the mobile-to-mobile communications signals. The 3 handset functions, transmit communications signal, receive communications signal, and receive MMC reference signal are judiciously staggered in time in the transmit and receive TDMA frames so that frame efficiency up to 100% occurs. This arrangement of functions in time is referred to as the time slot assignment plan and is provided by the method practiced according to the present invention.

The invention includes a method to design the plan to be sufficiently tolerant to variations in distance to the satellite from various mobile users so that all users within a beam can use the same exact transmit/receive time slot relationship. The assignment algorithm's tolerance to distance variations also permits operations with a satellite in inclined orbit. No operational changes are required as distance between users and the satellite vary throughout a 24 hour period. Also, the method provides sufficient guard time before and after each handset function to accommodate handset switching and retuning between receive, transmit and MMC carriers as well as to accommodate relative motion between the satellite and a user during a call without the need for complex and costly diplexer filters. Finally, the assignment plan is applicable to any and all beams within the coverage area.

In the preferred embodiment, a geosynchronous satellite is used to provide a plurality of beams, preferably each beam is approximately 0.69 degrees in beamwidth, within a coverage area. The coverage area is preferably contained within the 20° ground elevation angle to the satellite. Mobile-to-mobile satellite communications is achieved using a TDMA format, preferably with a frame length of 40 milliseconds divided into eight time slots, with each time slot preferably being further divided into three subslots. A handset uses two suitably separated time slots from the TDMA frame for transmitting and receiving communications on mobile-to-mobile carriers. The frequency/timing information is available from one of a plurality, preferably three, MMC signals provided on a separate gateway to mobile carrier (GW—MT) in the beam.

In the preferred embodiment, each MMC channel preferably occupies one subslot and the minimum guard time between any two handset functions is preferably ⅔ of a slot. An alternate arrangement of the preferred embodiment addresses the case where longer MMC signals are desired. For example, the MMC signals may be longer because of additional usage or calling system functions such as call waiting, short message service, functions for a tear down, call forwarding, call barring, call completion including hold and call waiting, number identification and call modification such as multiparty service. In this case, each MMC signal preferably occupies two subslots and minimum guard time between any two handset functions is preferably reduced to ½ of a slot.

As a result, the present invention provides a method and tools for structuring the time frame in TDMA carriers in which the MMC, receive slot, and transmit slots occupy assigned locations within the frame in an arrangement that avoids detrimental effects due to terminal movement, satellite movement, switching times, beam errors, and satellite inclination. The invention provides complete transmission of conveyed information by utilizing subslot assignments, assigned positions of guard time subslots, defined control (MMC) subslots and positioned communication slots for both receiving and transmitting information. In addition, the present invention provides frequency and timing references for low cost handsets. In addition, the method is applicable to mobile to gateway transmissions as well as mobile to mobile links in the communication system. Preferably, the assignment plan minimizes the number of MMC slots to save more time slots and satellite power for communications. Nevertheless, a sufficient number MMCs, preferably 3 equally spaced time subslots, guarantee meeting objectives of high frame efficiency while accommodating the required frame offset. One advantage of the assignment plan of the preferred embodiment is that the MMC assignment is good for the length of a call and avoids changing channel assignments in the frame.

BRIEF DESCRIPTION OF THE DRAWING

The present invention will be more clearly understood by reference to the following detailed description of a preferred embodiment when read in conjunction with the accompanying drawings in which like reference characters refer to like parts throughout the views and in which:

FIG. 3 is a table of frame offset across beam and inclination range of satellite orbit analysis;

FIG. 4 is a table of methodology for calculating the frame offset associated with mobile user movement in an analysis according to the present invention;

FIG. 5 is a diagrammatic representation of the total range of frame offset according to the present invention;

FIG. 7 is a table demonstrating receive and transmit slot assignments with a selected MMC slot;

FIGS. 9A and 9B are tables identifying a slot assignment plan for a frame according to the present invention;

FIG. 10 presents a table of comparison of slot alignments according to the present invention;

FIG. 11 is a table representing relative satellite power requirements to support the MMCs for the slot assignments according to the present invention;

FIGS. 12A and 12B represent a slot assignment plan where the MMC slot is ⅔ and guard time equals ½ slot;

FIG. 13 is a table of the slot assignment plan for use in a mobile terminal to gateway transmission.

DETAILED DESCRIPTION OF THE PREFERRED EMBODIMENT

Figure 1:
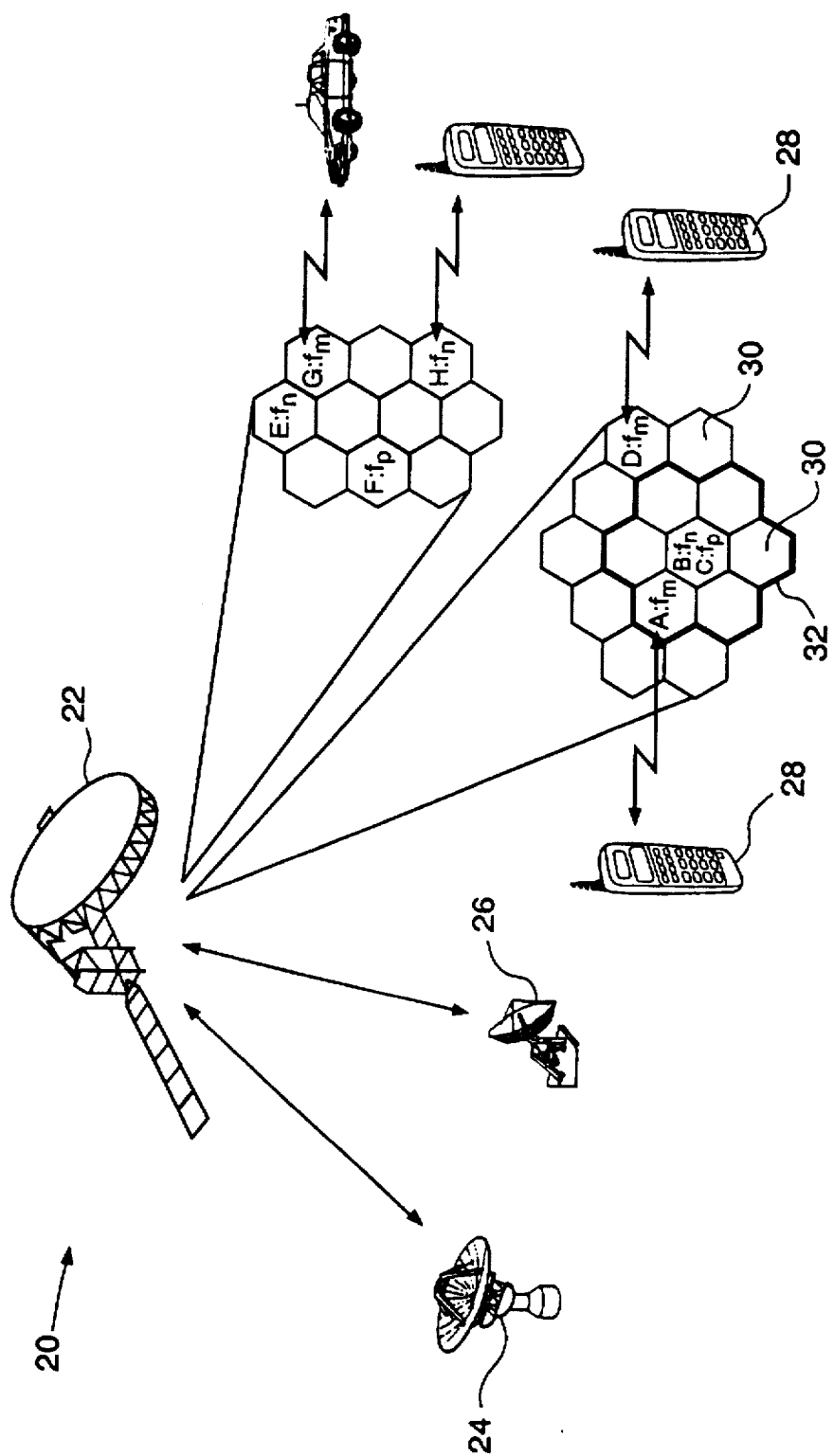
FIG. 1 is a diagrammatic view of a satellite system implementing the frame assignment constructed according to the present invention.

Referring first to FIG. 1, a mobile communication system 20 is thereshown including a geosynchronous satellite 22, and a primary gateway 24 that controls the satellite and all communication activity in the network. An intranetwork communication subsystem (INCS) handles control information between the primary gateway 24 and one or more metro gateways 26. The gateways 24 and 26 communicate with the satellite 22 through KU-band feeder links.

In addition, the system includes mobile terminals (MT) as diagrammatically indicated by the handset 28. However, while facsimile and other data transmitter terminals may form mobile terminals 28, the handset represents the simplest equipment that must be accommodated in the mobile system. Communication between the handsets 28 occurs through L-band mobile links including a plurality of beams 30 clustered in multiple-beam cells, for example seven-beam cell 32. For a call between a mobile terminal and a public switched telephone network, telecommunication traffic flows between the gateway and the satellite on the Ku feeder link and between the mobile terminal 28 and the satellite 22 on the L-band mobile link. A single two-way satellite circuit is used.

For a mobile terminal to mobile terminal call, telecommunication traffic flows between the mobile terminals 28 via the satellite 22 on the L-band mobile link, single hop. Two two-way satellite circuits are used, one for each mobile terminal. An individual circuit is assigned a time slot in a TDMA carrier. Each carrier has a unique frequency and the L-band frequency is reused across the beams to conserve bandwidth although the same frequency is not used in adjacent beams or in cells adjacent to the beam.

In general, when a mobile terminal to mobile terminal call has been initiated, the communication system determines in which beam each of the mobile terminals 28 is located. The system alerts the called mobile terminal 28 that a call request has arrived. The called mobile terminal 28 responds and is allocated a channel assignment. The system selects an allocated channel and sends an L-band frequency and time slot assignment to the calling mobile terminal 28. The system selects a second allocated channel from the pool and sends an L-band frequency and time slot assignment to the called mobile terminal 28. The system also commands the satellite payload processor to set up the frequency and time slot translation for each direction of the call.

Figure 2:
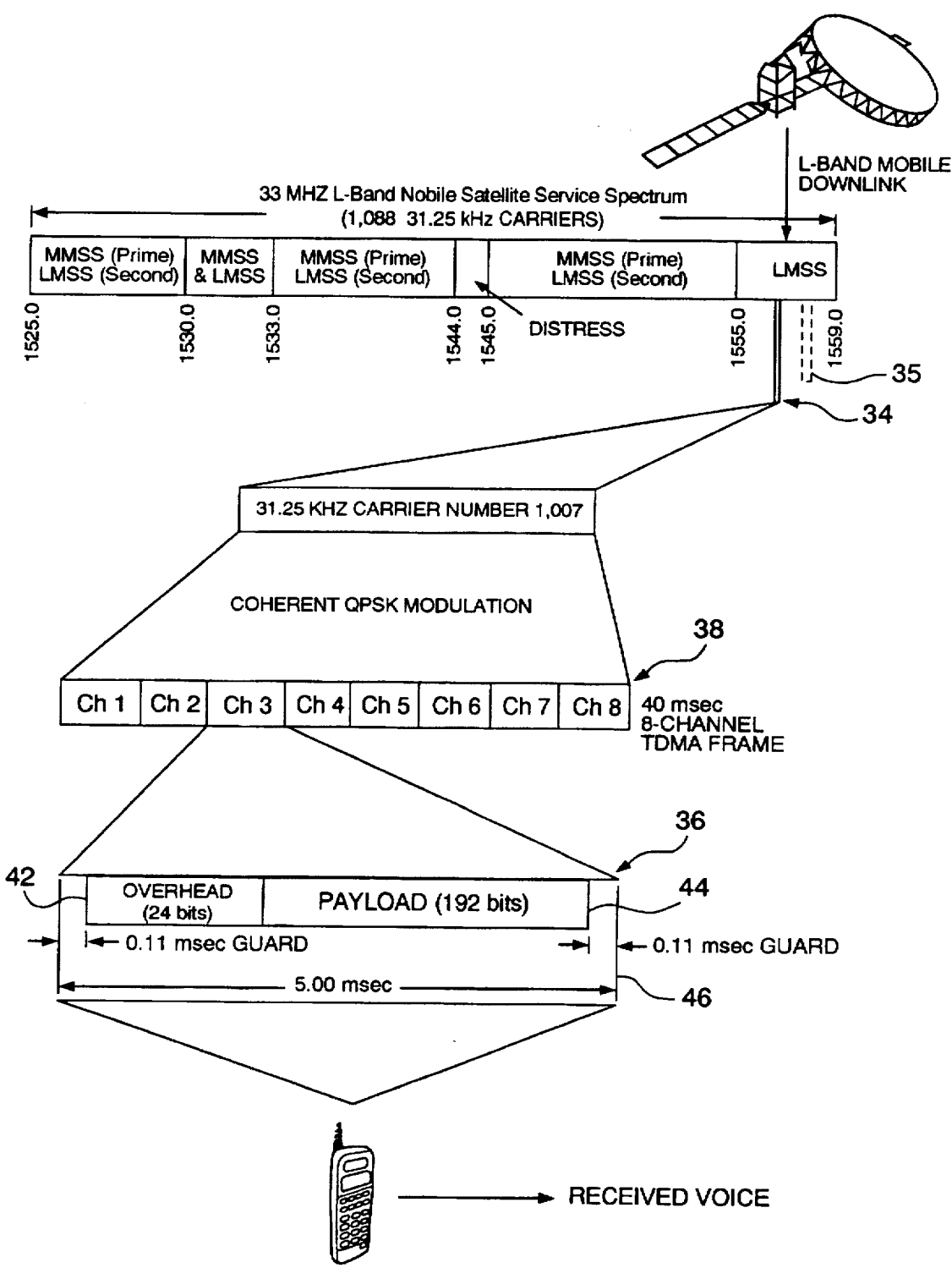
FIG. 2 is a diagrammatic representation of a modulation scheme using a prior art arrangement for communicating with the system shown in FIG. 1.

Referring now to FIG. 2, the TDMA carrier 34 contains time slots to which voice channels are assigned. As shown in FIG. 2, carrier number 1007 has been assigned as a transmit slot to transmit voice to the handset. Within the carrier 34, TDMA channel 3 has been selected as a voice communication slot 36 out of the 40 millisecond, eight channel TDMA frame 38. Other TDMA channels in the same carrier may be assigned to other voice circuits. The basic channel or slot 36 consists of three subslots 40. Each slot may include overhead bits 42 as well as communication data slot portions 44.

The present invention sets up an efficient frame construction in that modulation scheme that provides a relatively inexpensive timing reference in a manner that provides maximum mobile terminal to mobile terminal frame efficiency, maximum gateway to mobile terminal frame efficiency, minimum satellite EIRP overhead, and to minimize the need for modification of handset equipment. The present invention also provides high frame efficiency at any point in the coverage, high frame efficiency across the beam, and high frame efficiency throughout a day. As a practical matter, 100% efficiency is obtained to avoid loss of any transmitted information and data. As shown in phantom line at 35 in FIG. 2. This is accomplished in part by employing a least one additional carrier for control or communication signals as discussed below.

Several operational factors influence the frame efficiency, the satellite overhead EIRP, and the handset requirements. These factors are modeled analytically and are incorporated below.

The mobile terminal's position in the coverage must be considered. The satellite is the timing reference for the beginning of a transmit frame and the beginning of a receive frame. At the satellite, the difference between the start of a transmit frame and a receive frame will be known but will not necessarily be coincident or an integer number of frames apart. Furthermore, a user at an arbitrary position in the coverage will receive in a frame later and will transmit in a frame sooner than a user at the sub-satellite point. The frame offset (difference between the start of transmit and receive frames) may vary by 25 msec from 20 degree elevation angle to 90 degree elevation angle. Compensation for this variation plus the arbitrary offset time delay to process transmit or receive frames at the satellite means that MTs will operate over a full range of frame offset (0–40 msec).

Three operational factors associated with beams, that influence the frame offset that a user will experience, are beam position within coverage, MT position within beam, and beam pointing and beam identification errors. These three operational factors determine the frame offset for a user in any beam in the coverage area. The analytical methodology for the preferred embodiment is presented in FIG. 3 (right column). The worst-case beam is positioned at an elevation angle of 25.8 degrees such that one beam edge is at 20 degree elevation angle. The shortest and longest transmission times to the satellite for the beam are computed. The frame offset across the beam is computed as 2 times the difference in transmission times (6.64 msec).

The beam is mathematically enlarged to account for beam pointing error and beam error identification. In the preferred embodiment, each value is assumed to be a fraction, typically 10%, of beamwidth. The frame offset is multiplied by 1.2 to account for these errors resulting in a total frame offset across a beam of 7.968 msec peak to peak. Table 1 shows frame offset across the beam as a function of beam center elevation angle. A worst-case value of 8 msec will be carried forward to the next step of the preferred embodiment as an upper bound for all beams.

It is important that the frame structure and slot allocation rules accommodate this 8 msec peak to peak variation in frame offset. Failure to do so can result in loss of frame efficiency if allocation rules change as a function of MT position in the beam. In this case, allocations for users at the northern beam extreme could block users at the southern beam extreme because both users may be competing for the same transmit time slot. This undesirable circumstance occurs when the slot allocation rules change as a function of position within a beam. Rules that accommodate the peak to peak 8 msec offset are independent of user position within the beam and no loss of frame efficiency occurs.

Inclination of the satellite orbit causes a change in frame offset as a function of time of day for all users in the coverage area. The worst-case effects occur at 20 degree elevation due north and due south of the satellite. The methodology for computing this effect is also shown in FIG. 3. Transmission times to the satellite for plus and minus 5.2 degree inclination are computed. The difference of these transmission times multiplied by 2 yield a daily peak to peak variation of frame offset of 7.246 msec. Table 1 shows the variation in offset for other user positions indicated by elevation angle. A worst case value of 7.25 msec peak to peak is carried forward in this preferred embodiment as an upper bound value of frame offset.

TABLE 1

Frame Offset Across Beam and Inclination Range (Results)

| EL (deg) | Delta offset over day (msec) | Delta offset over beam (msec) |
|---|---|---|
| 20 | 7.2460 | — |
| 25 | 6.9882 | — |
| 25.8061 | — | 7.9680 |
| 30 | 6.6771 | 6.5378 |
| 35 | 6.3153 | 5.2993 |
| 40 | 5.9055 | 4.3631 |
| 45 | 5.4508 | 3.6197 |
| 50 | 4.9547 | 3.0074 |
| 55 | 4.4210 | 2.4879 |
| 60 | 3.8537 | 2.0361 |
| 65 | 3.2571 | 1.6341 |
| 70 | 2.6359 | 1.2688 |
| 75 | 1.9946 | 0.9303 |
| 80 | 1.3382 | 0.6104 |

Figure 9A:
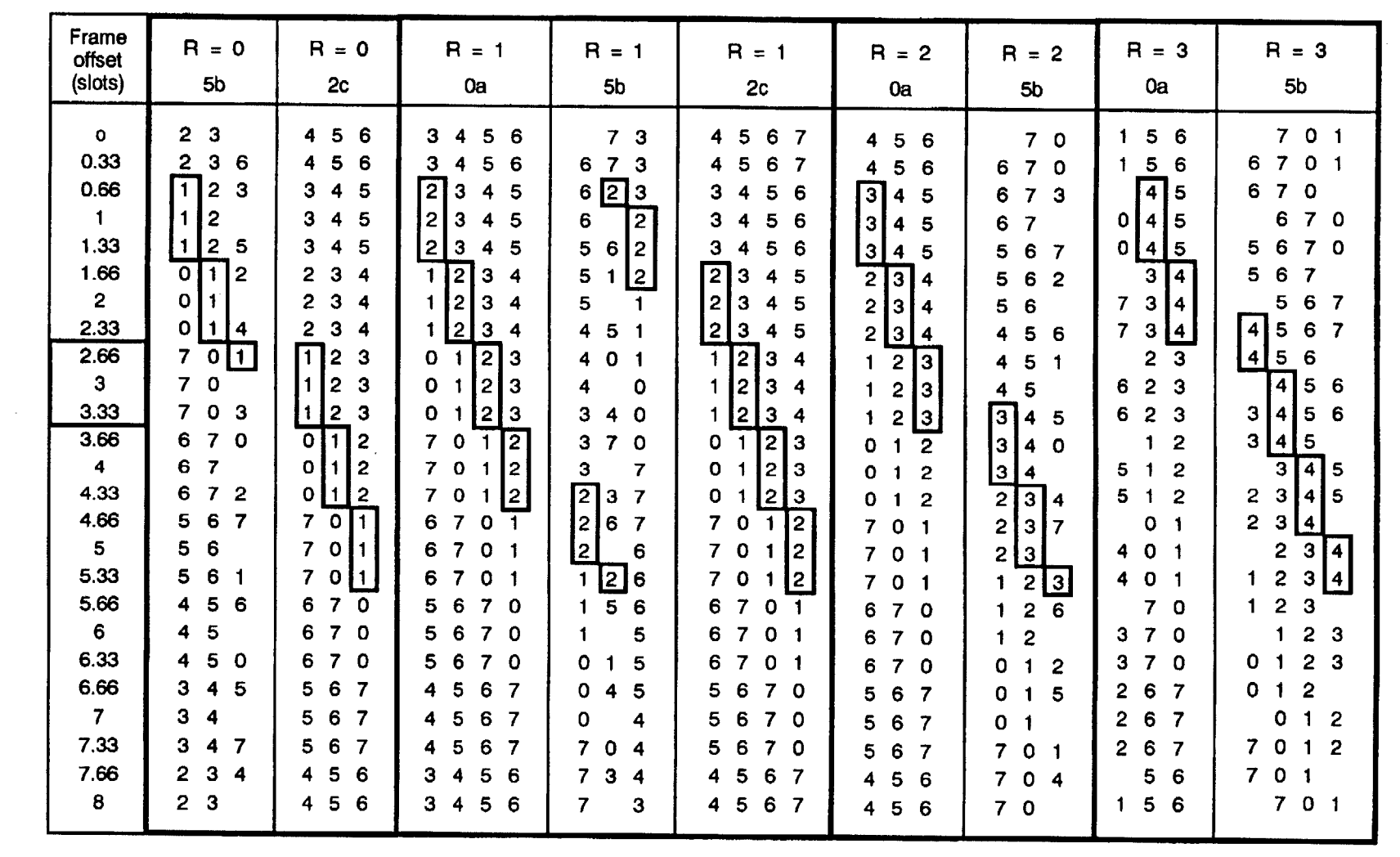

The factors of mobile terminal (MT) retune time and transmit/receive switch time affect the required guard time between any two MT functions (receive slot, transmit slot and receive MMC). Likewise, MT motion during call, satellite motion during the call, and call duration affect the guard time. For example, sufficient guard time must be provided between the transmit and receive slots to permit Transmit to Receive (T/R) switching and to accommodate any frame offset caused by spacecraft or MT movement. The spacecraft and MT motion are accounted for in the guard time to relieve the primary gateway from having to switch MMC assignments to mobile users during a call. For example, a sufficient guard time is provided to keep time slot 5b as the MMC for the duration of an entire phone call. Referring to FIG. 9a, for example, a user at a frame offset value therefor of 2.67 could receive at slot 0 (R=0) and transmit at slot 1 (see shaded entry) and would listen to time slot 5b for timing and frequency references.

FIG. 4 presents the methodology for the calculation of the frame offset associated with MT motion. An MT is assumed to be at 20 degree elevation due north of the satellite. Several parameters are computed leading to transmission time to the spacecraft. The MT is assumed to move south at 100 km/hr for 30 minutes. The parameters including transmission time are again computed for the new MT position. The frame offset is given by 2 times the difference in transmission times to the satellite from the two MT positions.

Table 2 presents a summary of results for both spacecraft motion and MT motion. The spacecraft motion term shown in Table 2 is simply the effect of spacecraft velocity times the call duration. Table 1 indicates that the worst case beam at edge of coverage (ground elevation angle (EL)=20°) experiences a 7.246 msec offset over the range of spacecraft inclination. This takes 12 hours to occur, and the average rate of change is 7.246/12 or 0.604 msec/hr. At the equatorial crossing the rate is $\pi/2$ faster than the average, and the maximum rate is 0.9485 msec/hr. This factor times the call duration yields the appropriate offset value. The MT motion methodology is that used in FIG. 4. The entries in Table 2 are for various combinations of speed and call duration.

A peak value of 0.8 msec (0.5 for the spacecraft and 0.3 for the MT) is carried forward in the preferred embodiment as an upper bound for all users. The 0.8 msec value is extremely conservative and is chosen only since the system can easily accommodate it. A more realistic upper bound would be for 10 minute calls where the spacecraft motion term is 0.16 msec and the MT motion term is 0.10 msec. The realistic total could then be 0.26 msec.

TABLE 2

| Call Duration | Offset from S/C Motion 0.9485 | Offset from MT Motion MT Speed (km/hr) | | | | | |
|---|---|---|---|---|---|---|---|
| (min) | msec/hr* | 0 | 20 | 40 | 60 | 80 | 100 |
| 0 | .0000 | .0000 | .0000 | .0000 | .0000 | .0000 | .0000 |
| 10 | .1581 | .0000 | .0209 | .0418 | .0627 | .0836 | .1044 |
| 20 | .3162 | .0000 | .0418 | .0836 | .1253 | .1670 | .2088 |
| 30 | .4742 | .0000 | .0627 | .1253 | .1879 | .2505 | .3130 |

Table 3 shows this 0.80 msec of frame offset from worst case motion assumption combined with 2.2–2.5 msec of MT switch time, designated as case 1. This range of values for switch time or retune time is consistent with the current technology (common air interface, CAI) for basic architecture of the handset. The total frame offset for offsets listed in Table 3 will be accommodated by a guard time placed between any two of the three handset functions. The total guard time required is just under ⅔ slot for Case 1.

Case 2 addresses the situation where no terms are included for spacecraft or MT motion. This has some implications on the MMC assignments to users as will be discussed later.

Table 4 shows the guard time for Case 1 is positioned before and after a receive communications slot. This resulting guard time also applies before and after the MMC receive function. With guard time placed around the receive functions, no further guard time is required for the transmit communication slot.

TABLE 3

Total Guard Time

| Frame Offset Source | Case 1 Worst case motion | Case 2 No motion |
|---|---|---|
| MT switch and retune time (msec) | 2.2–2.5 | 2.2–2.5 |
| S/C motion during call (msec) | 0.5 | — |
| MT motion during call (msec) | 0.3 | — |
| Total offset (msec) | 3.0–3.3 | 2.2–2.5 |
| Total offset (slots) | (⅔) | (½) |

TABLE 4

Slot and Guard Time Arrangement

| | | | |
|---|---|---|---|
| Case 1 | 3.3 msec ⅔ slot Guard Time | 5.0 msec 1 slot Comm. | 3.3 msec ⅔ slot Guard Time |
| Case 2 | 2.5 msec ½ slot | 5.0 msec 1 slot | 2.5 msec ½ slot |

Table 5 summarizes the effects described above and quantitatively indicates the impact for each group of factors. All of these results are carried forward in the preferred embodiment.

Figure 5:
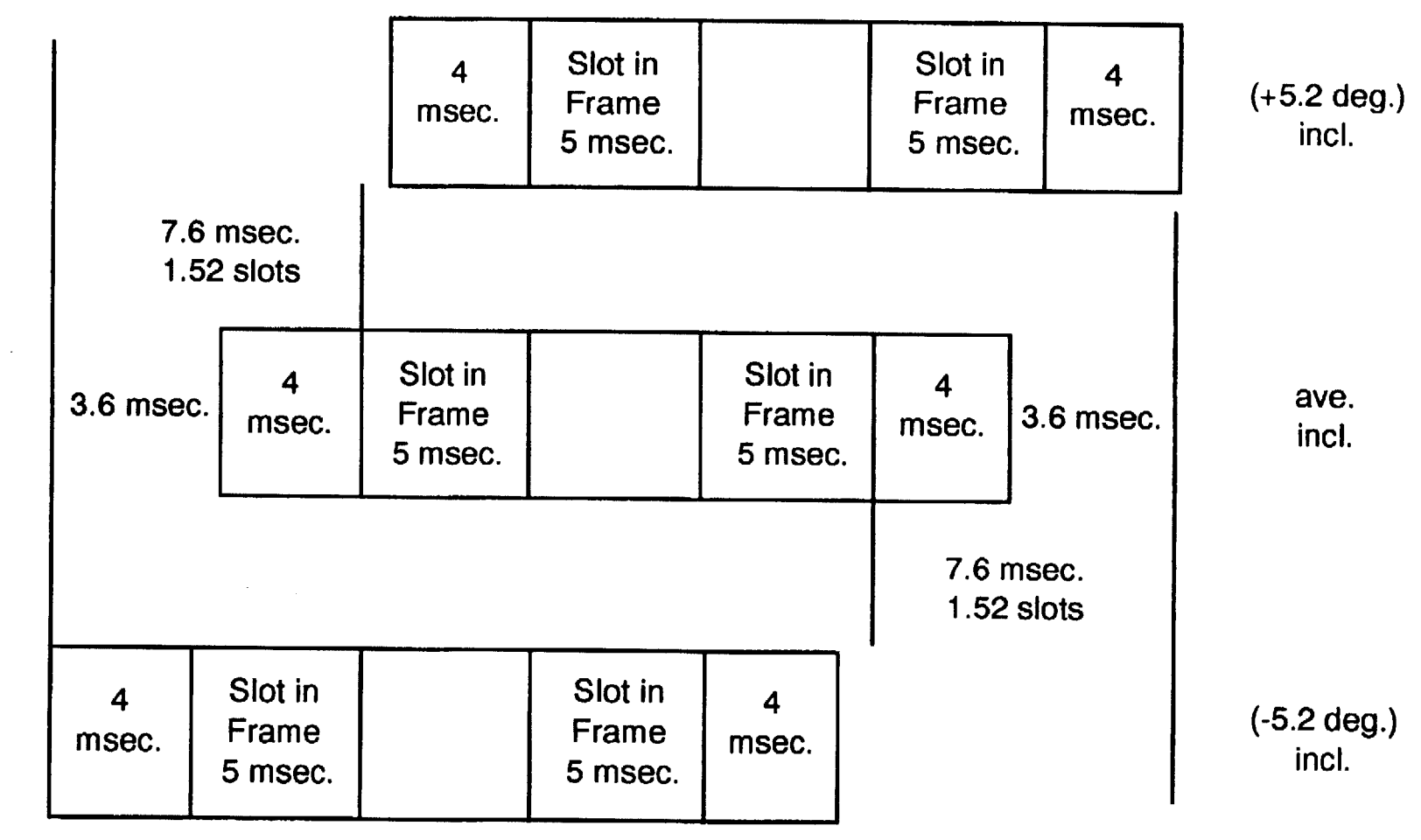

FIG. 5 shows user slots in a frame bounded by 4 msec on each side for variation across a beam (8 msec peak to peak).

In addition, this arrangement is also shown shifted left and right by 3.6 msec to account for satellite inclination (7.25 msec peak to peak).

A preliminary conclusion at this point is that to accommodate variation across a beam, the slot allocation plan should be constant for a frame offset range of ±4 msec or ±0.8 slots. In order to accommodate variation across a beam and over any day, the slot allocation plan should be constant for a frame offset range of ±7.6 msec or ±1.52 slots. The significance of this conclusion will become readily apparent in the next section.

TABLE 5

Impact of Operational Factors

| Operational Factor | Impact |
|---|---|
| 1. MT position within coverage | 0–40 msec frame offset at MT |
| 2. Beam position with coverage | |
| 3. MT position within beam | 8 msec peak to peak frame offset across worst beam (±0.80 slots) |
| 4. Beam pointing and identification error | |
| 5. Satellite in 5.2 degree inclined orbit | 7.25 msec pk-pk frame offset across a day in worst beam ±(0.73 slots) |
| 6. MT motion during call | 3.33 msec (⅔ slot) peak guard time (case 1) |
| 7. Spacecraft motion during call | |
| 8. Call duration | 0.5 msec (½ slot) peak guard time (case 2) |
| 9. MT retune time and T/R switch time | |

The data presented in Table 3 and Table 4 indicates that for case 1, a guard time of ⅔ slot is needed between the various MT functions of transmit signal, receive signal, and receive MMC. The transmit and receive signals each occupy a 5 msec slot within the frame. The minimum possible size of an MMC is 1.66 msec or ⅓ slot. These two parameters form the basis of a candidate frame structure. The remaining open frame structure items are the number and location of MMCs provided on the GW-MT carrier. For a frame efficiency of 100%, at least two MMCs must be used on the GW-MT carrier in order to permit signal reception or transmission coincident in time (carried in frame slots of like number) on the MT-MT communication carrier, and compensate for the already used arbitrary time slot coincident in time with the first MMC time slot selected. This mobile terminal would then use the second MMC occurring elsewhere in the frame of the GW-MT carrier. However, the number of MMCs may be further selected to provide a frame efficiency of 100%.

Three criteria are used to evaluate candidate frame structure and their related slot allocation plans. These are satellite overhead EIRP, handset complexity, and frame efficiency. Three types of frame efficiency are defined as follows:

Single point frame efficiency is 100% when all eight receive slots are each associated with a unique transmit slot at a single point in the coverage, and an assignment plan does not include any effect of compensation for movement such as satellite orbit inclination.

Beam frame efficiency is 100% when all eight receive slots are each associated with a unique transmit slot and the connection arrangement is constant for users anywhere in a beam, but not including the effects of satellite orbit inclination. For this situation, the slot allocation plan must be constant over a frame offset range of ±0.8 slots.

Day frame efficiency is 100% when all eight receive slots are each associated with a unique transmit slot and the connection arrangement is constant for users anywhere in a beam at any time of any day. In this situation, the slot allocation plan must be constant over a frame offset range, for example, an offset range of ±1.52 slots.

The approach to achieving high efficiency (100%) is to find the minimum number of MMCs and their most effective positions within the frame.

An evaluation process is best explained by means of an example. For example, the case where the guard time is set to ⅔ slot (case 1) and the MMC length is ⅓ slot.

Four steps in the evaluation process are as follows:

1) Find the allowable receive/transmit slot assignments as a function of frame offset for each possible MMC location.
2) Find the MMC locations that permit making a selected receive/transmit slot assignment as a function of frame offset.
3) Using the results of step 2, select the minimum number and location of MMCs required for adequate frame efficiency.
4) Generate the receive/transmit slot assignment table.

Figure 6:
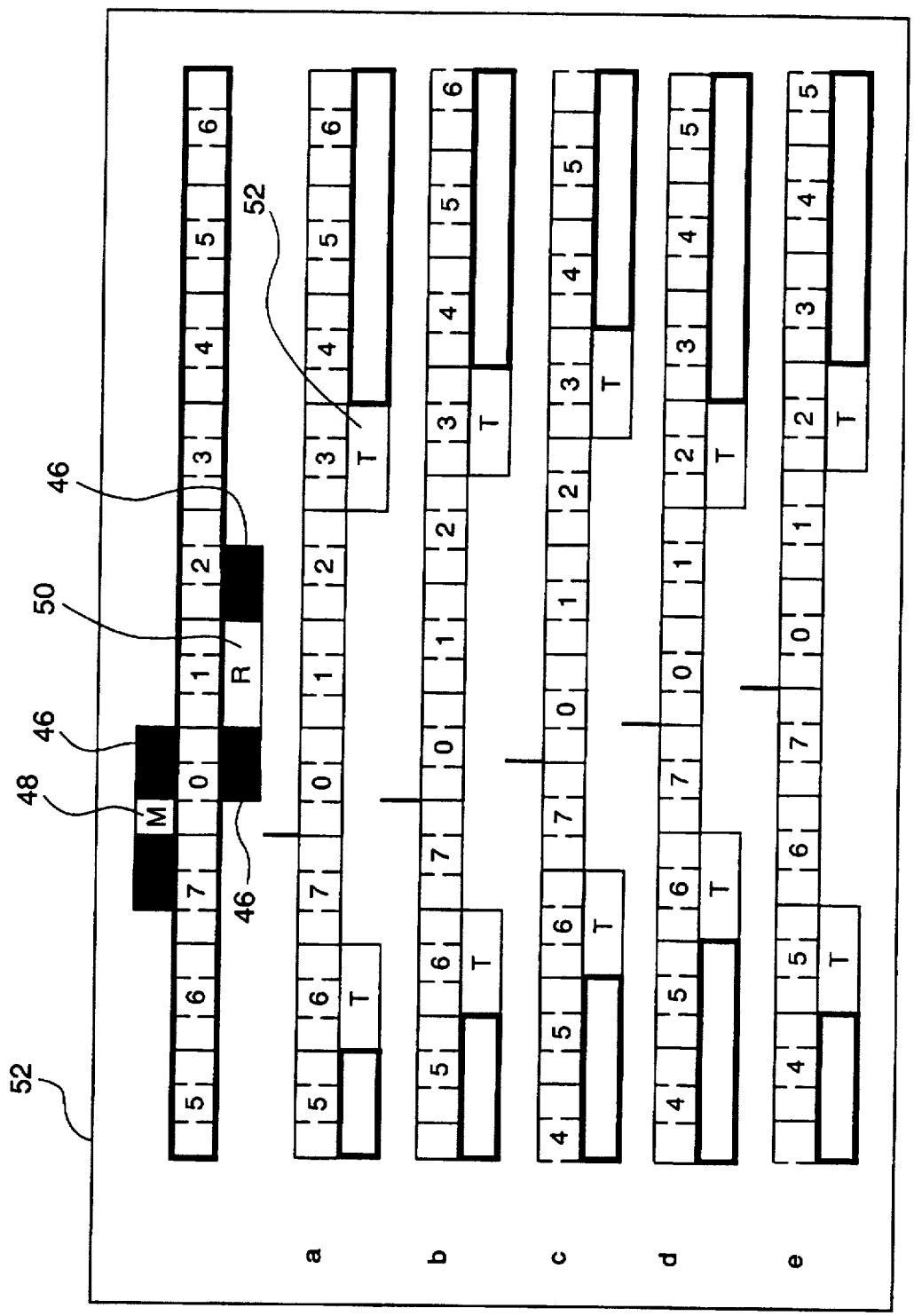
FIG. 6 is a diagrammatic view of a tool for determining allowable receive and transmits slot assignments as a function of frame offset for each possible MMC location.

The allowable communication slot (receive/transmit slot) assignment is easily achieved with a slide rule like tool shown in FIG. 6. The top bar (shaded) is the stationary part of the tool and indicates the MMC 48 location as subslot 0a. For this MMC location, slots 1 through 6 are available as possible receive slots.

Starting with the receive function 50 in slot 1, guard times 46 are positioned around the MMC 48 and the receive slot. Line "a" depicts a slider bar also with time markings. It is aligned in time with the shaded bar indicating zero frame offset. On line "a" the possible transmit slots 52 are 3 through 6. Line "b" corresponds to a frame offset of ⅓ slots (moving the slider corresponds to offsetting the frames). For line "b" the possible transmit slots are again 1 through 6. FIG. 7 shows these possible transmit slots 52 listed under receive in slot 1 for offset values of 0 and 0.33. The slider is repeatedly moved and the possible transmit slots are entered into FIG. 7. When the column for receive in slot 1 is complete, the receive function is moved to slot 2 and the above process is repeated. When FIG. 7 is completed for the MMC in subslot 0a, the MMC is moved to 0b and process is repeated. Although this process seems tedious, all of these steps can be done rather quickly on a spreadsheet.

A complete set of twenty-four tables (one for each possible MMC location) provides a thorough examination that shows that two MMCs cannot yield a single point frame efficiency of 100%, no matter which two MMC locations are selected. Therefore, three or more MMC's should be selected to use the frame efficiently with the selected guard time and MMC slot size as shown in FIG. 6.

Figure 8:
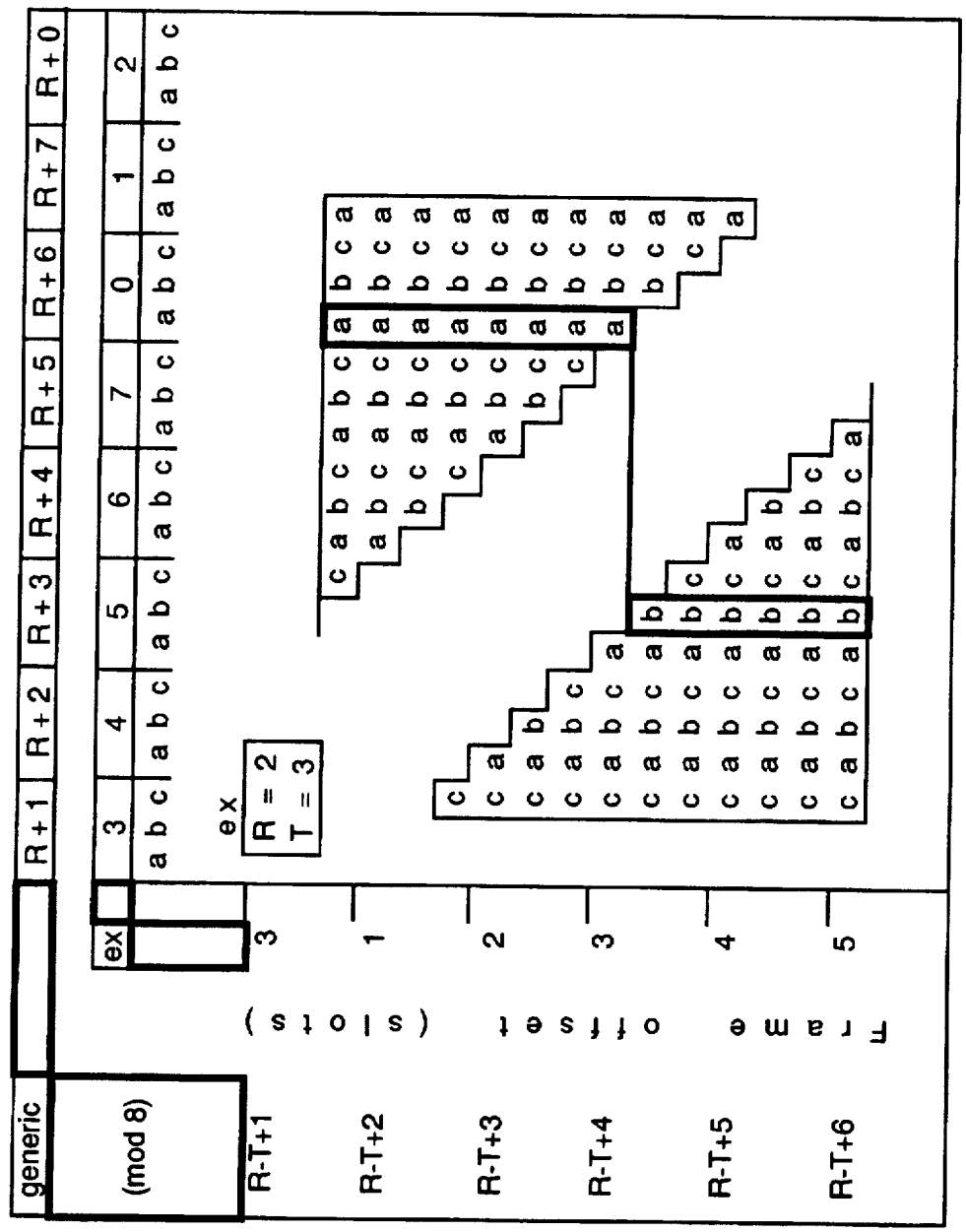
FIG. 8 is a graphic representation of an MMC locator where selected receiving slot and selected transmitting slot have been identified.
Figure 14:
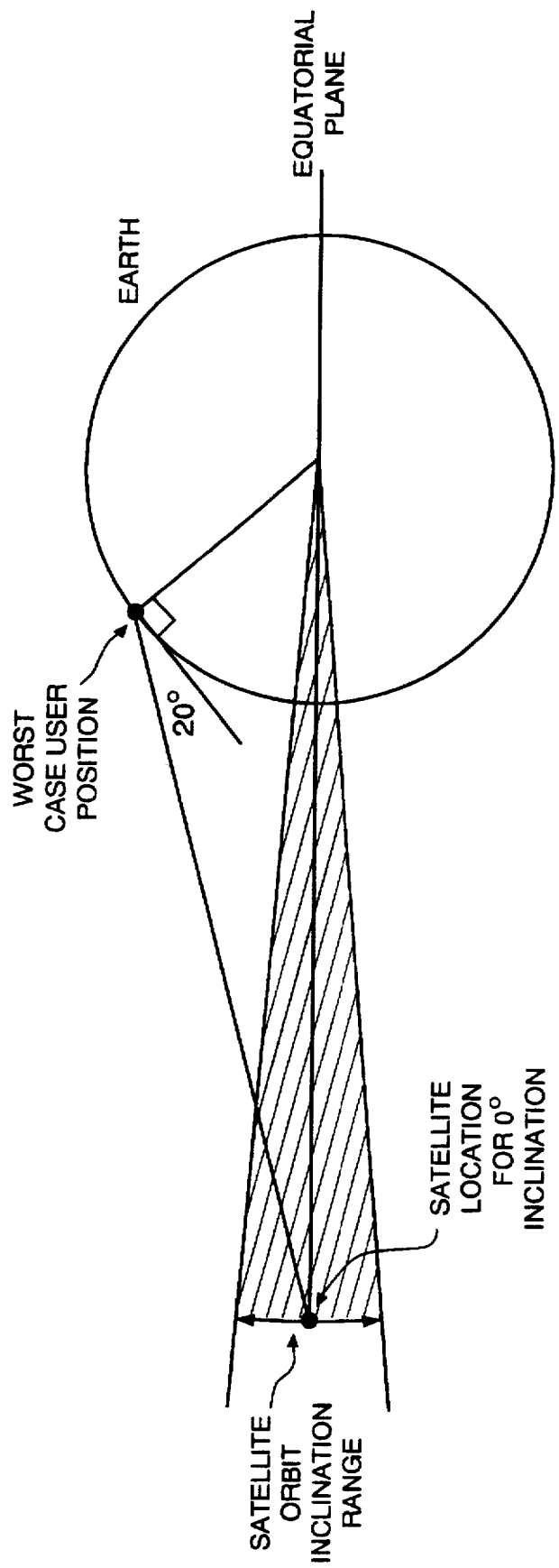
FIG. 14 is an enlarged representation of the total coverage area shown in FIG. 1.

One step includes identifying all MMC locations that permit making a selected communication slot assignment pairing (R=No. of frame slot, T=No. of frame slot) as a function of frame offset, which is best done on a graph where the horizontal axis is the 24 subslots in a frame and the vertical axis is the frame offset measured in slots. Such a graph is shown in FIG. 8 for the case of receiving in slot 2 (R=2) and transmitting in slot 3 (T=3). MMC locations that accommodate this receive/transmit selection are identified by the alphabet characters in their respective column over the appropriate range of frame offset.

The two triangles in FIG. 8 are the same for any selection of receive and transmit slots as long as the MMC length and guard time are constant. Only the position of the two triangles changes as different transmit/receive combinations are selected. If the selection of the receive slot is increased or decreased, the two triangles move in formation to the right or left, respectively. If either the transmit or receive assignment is changed, the two triangles move in formation vertically. The position of the triangles for arbitrary transmit/receive assignments can be determined from the top row and left column in FIG. 8. The top row and left column are labelled "generic," and the frame slots and offset entries are given as functions of T (transmit slot) and R (receive slot). The next inner column and row list the specific values of slots and offsets for our example of R=2 and T=3.

The two triangles will change shape, size and relative position if different the MMC length and guard times are selected. Only their combined position changes for different combinations of receive and transmit slot assignments. The triangles then act as a characteristic function for a given set of MMC and guard time lengths, and becomes a very useful tool for finding the rules for the MMC spacings.

Another step includes selecting the number and location of MMCs required to achieve high frame efficiency. Columns 0a and 5b in FIG. 8 are shown as shaded. If these subslots contain MMCs, then R=2 and T=3 can be maintained over a peak-to-peak frame offset range of 4.67 slots. This value is sufficiently large to accommodate the ±1.52 slots of frame offset associated with the variation over the worst beam and variation over the worst day. MTs with low values of offset can use the MMC in 0a and those with larger values can use the MMC in subslot 5b.

However, if FIG. 8 is redrawn for R=0, then column 0a will have no entries and column 5b will only cover 2.00 slots of frame offset, which is not adequate. The remedy to this situation is to add a third MMC. The location, however, has to be carefully selected. In order to cover a wide range of frame offset, a pair of MMC subslots must have a subslot spacing greater than or equal to eight. This fact is readily evident from inspection of FIG. 8. Another condition for three MMCs is that the sum of the three spacings must equal 24 since the subslots repeat at this interval.

There is only one way to list three spacing values greater than or equal to 8 whose total equals 24. This way occurs when all three spacings are equal to 8. The first five of twenty-four acceptable MMC locations are listed in Table 6.

TABLE 6

| Spacing | Acceptable MMC Locations | | | |
|---|---|---|---|---|
|  | 8 | 8 | 8 |  |
| MMCs | 0a | 2c | 5b | 0a |
|  | 0b | 3a | 5c | 0b |
|  | 0c | 3b | 6a | 0c |
|  | 1a | 3c | 6b | 1a |
|  | 1b | 4a | 6c | 1b |
|  |  |  |  | etc. |

Figure 9B:
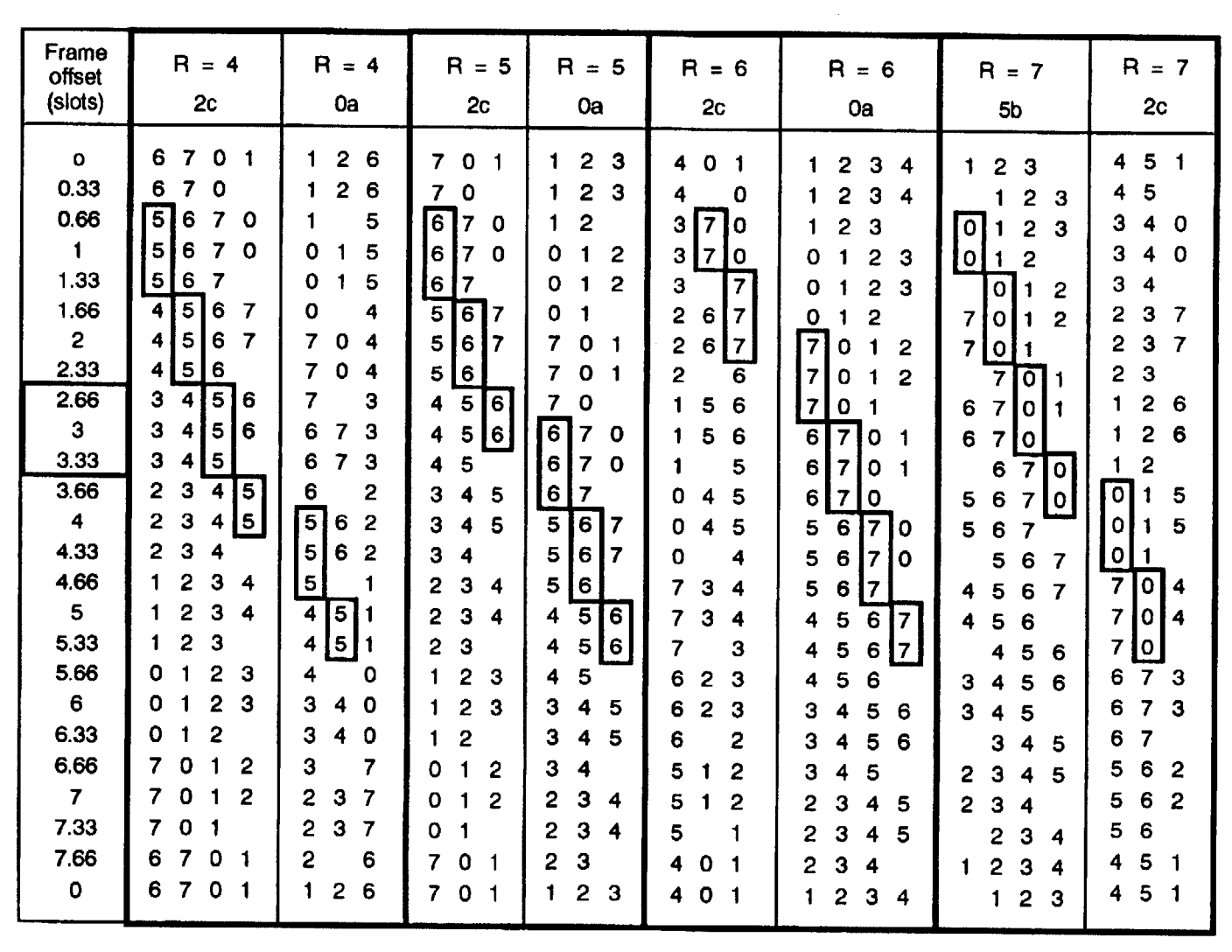

Another step includes generating the receive/transmit slot assignment table. As an example, this is done for the Top Row (0a, 2c, 6b, 0a) of Table 6. This selection is somewhat arbitrary. No compelling reason has been found to prefer a particular set of MMC locations. The receive/transmit assignment table for this case of MMCs in subslots 0a, 2c and 5b is shown in FIGS. 9A and 9B. The table is constructed by assembling the appropriate portions of the data in tables like FIG. 7 for each MMC assigned subslot 0a, 0b, 0c, etc. in ascending order of receive slot assignment.

Certain entries in FIGS. 9A and 9B are shaded. These entries are to be used for MTs in a beam with a beam center frame offset values of 3±½. For these MTs, the transmit slot assignment is equal to the receive slot plus one (modulo 8).

For beam centers with offset values near 4, the transmit slot number is equal to the receive slot number at the satellite. In general, the transmit slot is given by T=R+4−nearest integer offset (mod 8).

The offset of a center of a beam is determined for various beams across the coverage area, for example, by determining the average of the biggest and smallest offset across the beam. The beam center offsets will not generally occur at integer values. We therefore create an offset window, as shown at the left of FIG. 9A, that is one slot wide and centered on integer values of offset. The window for an offset value of 3 is bordered in the offset column (on the left) of FIGS. 9A and 9B. The useful range of offset extends 1.84 slots above and below the window. This value easily meets the requirement of 1.52 slots identified in FIG. 5.

This assignment plan is made shortly after the satellite is launched and the orbit parameters are determined. This assignment for each beam center position on Earth is computed using the simple expression given above for a point in time when the satellite is at 0 degrees inclination. The resulting transmit/receive slot relationships for each beam center are then good over each entire beam for the life of the satellite.

The guard time of ⅔ slot used in an example candidate frame structure corresponds to case 1 in Table 9. The spacecraft and MT motion terms are included in the guard time to ensure use of the same MMC during the call. For instance, an MT with a frame offset value of 2.67 could be assigned use R=0 and T=1 (see FIG. 9A) and could be assigned use either MMC 2c or 5b. Either would be available for the duration of the call since the motion terms were included in the guard time.

Alternatively, we can delete the motion terms if we are careful about assignment of MMCs to MTs. For instance, the MT with a frame offset of 2.67 can be assigned to 5b when the frame offset is expected to get smaller, or to 2c when the frame offset is expected to get larger. This requires keeping track of whether the distance from the MT to the satellite is increasing or decreasing at any point in time.

An alternative approach is to avoid assigning R=0 to the MT with the offset of 2.67. Instead, assign a receive slot to that MT that does not have an MMC transition occurring at an offset value of 2.67. A complete set of transition points is presented in Table 7. They are not numerous and an algorithm to avoid them is relatively simple.

TABLE 7

| | MMC Transition Points | | |
|---|---|---|---|
| Receive Slot | Transition 0a–2c | Transition 2c–5b | Transition 5b–0a |
| 0 | — | 2.67 | — |
| 1 | — | 1.67 | 4.67 |
| 2 | — | — | 3.67 |
| 3 | — | — | 2.67 |
| 4 | 4.00 | — | — |
| 5 | 3.00 | — | — |
| 6 | 2.00 | — | — |
| 7 | — | 3.67 | — |

The same four step evaluation process is used to evaluate other frame structures to determine their performance parameters. With the MMC size maintained at ⅓ slot, the guard time was varied from 0 to 1 slot in increments of ⅓ slot. In addition, the guard time was held constant at ⅔ slot and the MMC size was increased to ⅔ slot. The case of guard time equal to 0.5 slot was also evaluated as desirable when deleting the motion terms from the guard time (case 2 from Table 3).

FIG. 10 presents a comparison of the cases considered in terms of the number of MMCs required to achieve 100% frame efficiency. The upper entry with the dark border is the example frame structure described earlier in some detail. Note that the number of required MMCs could be reduced from three to two if the guard time could be reduced to ⅓ slot. However, this would require a significant reduction in handset transmit/receive switch time and the retune time for jumping between the MMC carrier and the receive/transmit carriers. No reduction in MMCs is available at the ½ slot guard time as long as the MMC length is ⅓ slot.

FIG. 11 shows the relative satellite power requirement to support the MMCs for each case considered. Some reduction in power is available with reduced guard time but with the same handset impact as indicated above.

Figure 12A:
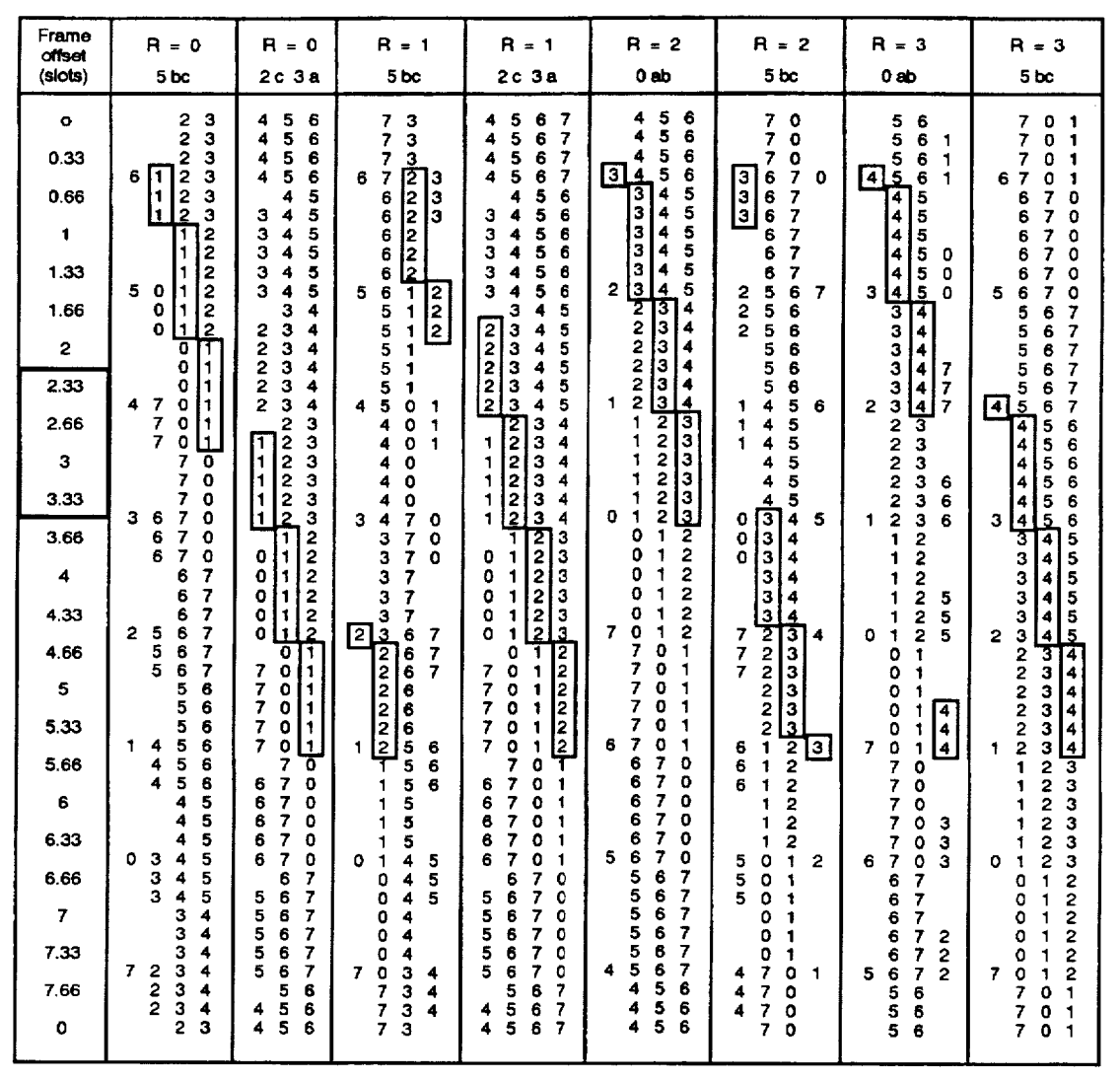
Figure 12B:
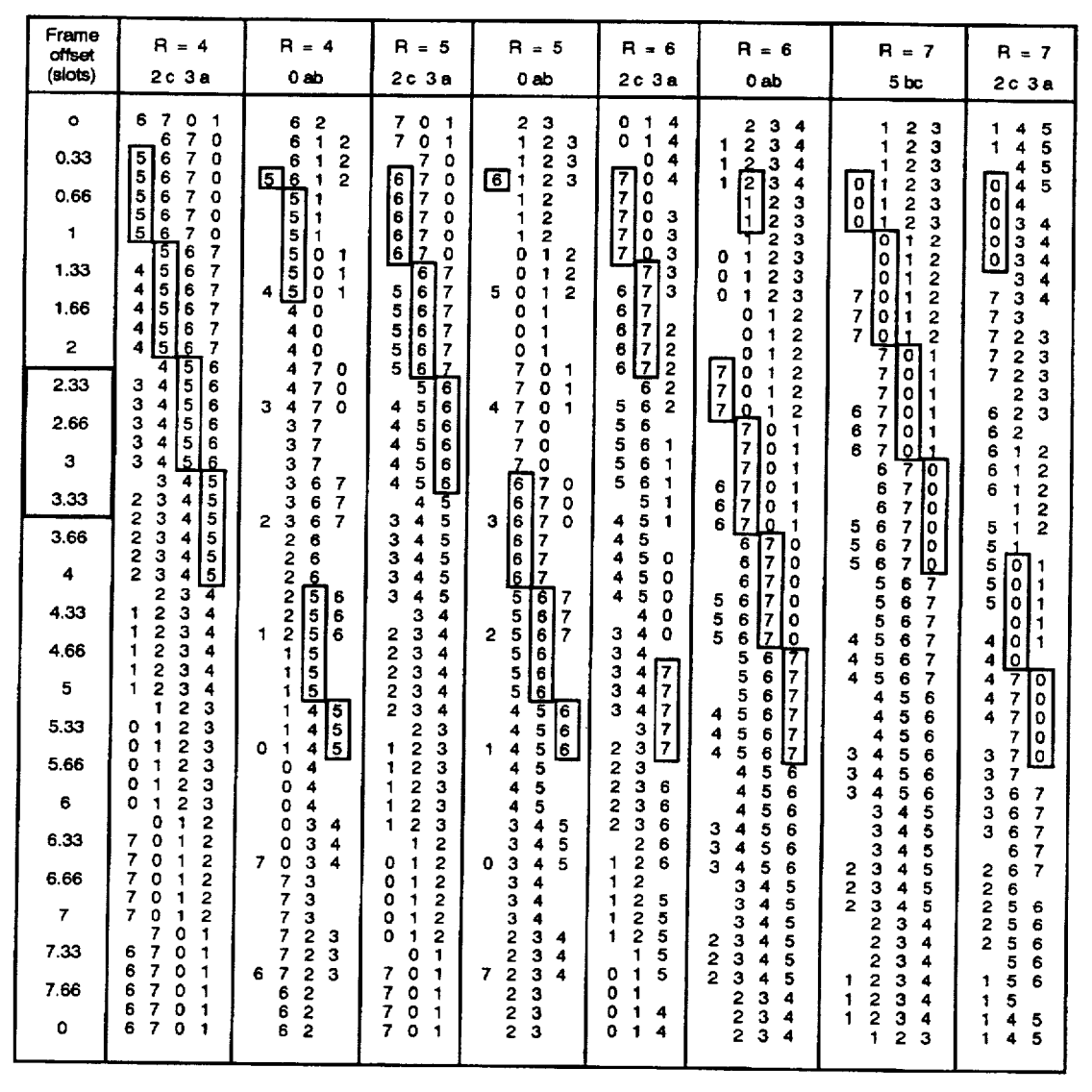

The length of the MMC is dependent upon the functions such as call waiting, etc. to be included with the communication system. If it is ⅓ slot in length, then the design example with guard time equal to ⅔ slot is the best practical choice. As indicated in both FIGS. 10 and 11, if the MMC is ⅔ slot in length, then it is desirable to use a smaller guard time of ½ slot. The slot assignment plan for an example of this type is presented in FIGS. 12A and 12B for MMCs located in subslots 0ab, 2c3a, and 5bc. This plan has the same beneficial attributes as the plan in FIGS. 9A and 9B. The main difference is the MMC length and locations.

The allowable MMC locations triangle chart for this case are made (similar to FIG. 8) along with the 24 tables (like FIG. 7) of possible receive and transmit slot assignments.

Figure 13:
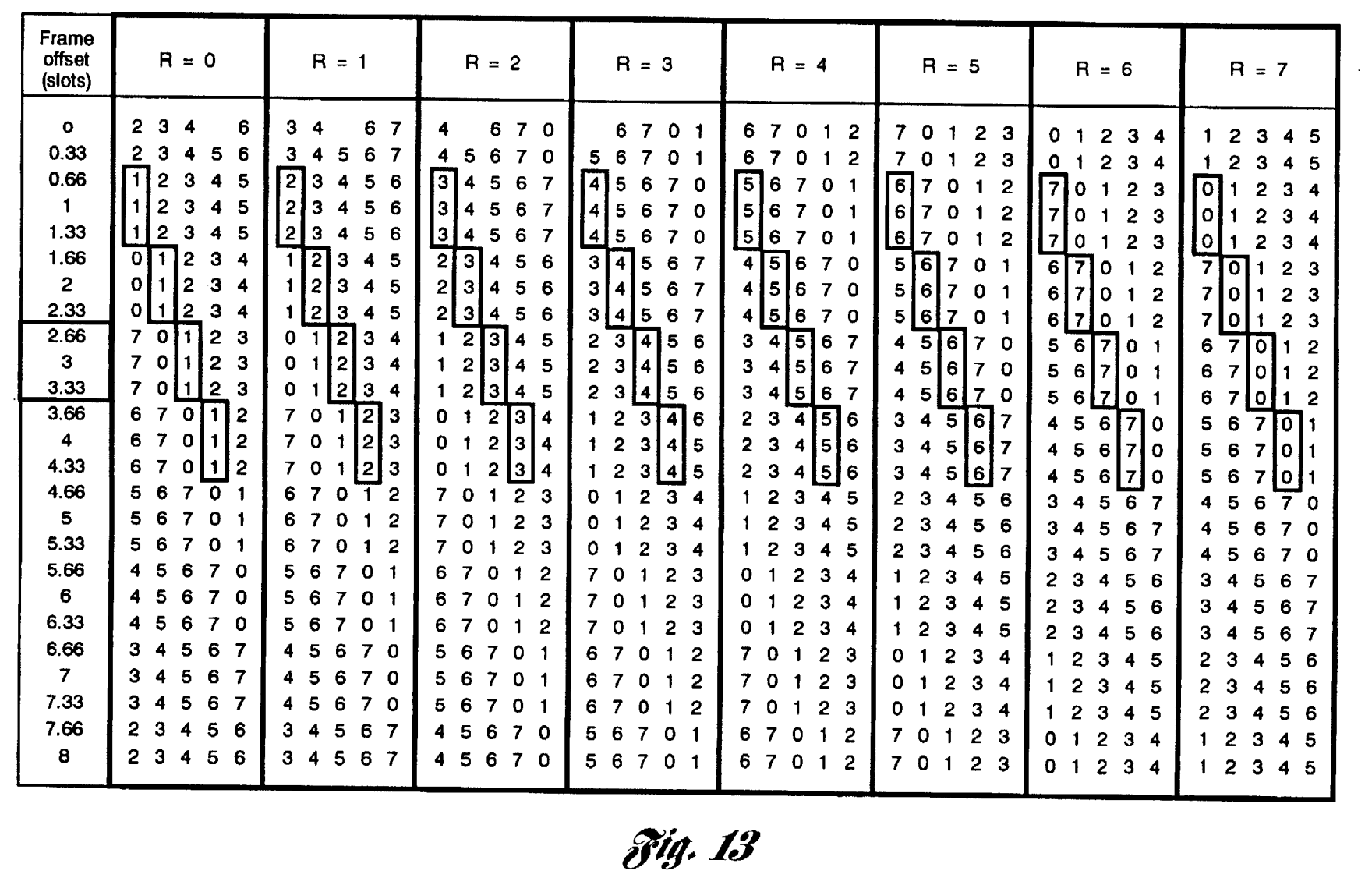

FIG. 13 shows the transmit/receive slot assignment plan for MT-GW communication. This plan shares the same beneficial features as either MT-MT slot assignment plan, and is consistent with either MT-MT plan. In addition, the large number of transmit slots associated with each receive slot easily accommodates the multi-slot assignments required for fax and data transmission.

Having thus described the preferred embodiment of the invention, many modifications will become apparent to persons of ordinary skill in the art to which it pertains, without departing from the scope and spirit of the present invention as defined in the appended claims. For example, other arbitrary selections of frame length, the number of slots and subslots, the number of slots for MMC, the number of beams and the beam size may be made while utilizing the method and slot assignment of the present invention.

What is claimed is:

1. A method for achieving high efficiency frame structures in a TDMA communication signal having a plurality of frames for a telecommunication system with mobile terminals and a relaying satellite, each frame including at least one terminal command portion (MMC), and at least one of a receive signal portion and a transmit signal portion, comprising:

selecting a number of MMC portions by determining a frame offset in communication between said satellite and said mobile terminals;

determining a guard time portion;

determining allowable communication slot assignments as a function of said frame offset for each possible MMC portion location including generating a communication slot assignment table with compensation for said frame offset to receive signals and transmit signals;

selecting a communication slot assignment that permits continuous use of an MMC slot throughout said frame offset;

selecting the minimum number and location of MMC portions required for improved frame efficiency;

assigning an MMC location to a mobile terminal depending upon said offset; and generating a TDMA communication signal with said minimum number of terminal command (MMC) portions on a first carrier, and said at least one of a receive portion and a transmit portion, selected according to said assignment tables, transmitted on at least one second carrier.

2. The invention as defined in claim 1 wherein said determining a frame offset comprises quantifying the position of a mobile terminal in a satellite beam providing coverage.

3. The invention as defined in claim 2 wherein said quantifying step comprises determining the difference in transmission times from each of two mobile terminals and multiplying it to define a time slot portion of frame offset for the signal.

4. The invention as defined in claim 1 wherein said determining frame offset comprises quantifying the satellite beam center pointing error.

5. The invention as defined in claim 1 wherein said determining a frame offset comprises quantifying the beam identification error.

6. The invention as defined in claim 1 wherein said determining a frame offset comprises quantifying the mobile terminal position in a coverage area made up of multiple beams produced by a satellite.

7. The invention as defined in claim 1 wherein said determining a frame offset comprises quantifying a satellite inclination offset change over a period of one day.

8. The invention as defined in claim 1 wherein said determining a guard time comprises quantifying the movement of the mobile terminal.

9. The invention as defined in claim 8 wherein said quantifying is determined as a selected velocity for a selected duration of time.

10. The invention as defined in claim 1 wherein said determining a guard time comprises quantifying a satellite movement in a non stationary orbit.

11. The invention as defined in claim 1 wherein said determining a guard time comprises examining the retune time of a mobile terminal.

12. The invention as defined in claim 1 wherein said determining a guard time comprises examining the transmit to receive switching time of a mobile terminal.

13. A method for generating a communication signal with a TDMA carrier frame design providing a frequency and timing reference for time division multiple access communication between mobile terminals relayed through a satellite communication system, comprising:

assigning an MMC time portion from a minimum number of MMC time portions, to a mobile terminal receiving a gateway timing reference source and delivered on a first carrier from said satellite; said assigning depending upon a time delay induced by the location of said handset relative to said satellite;

selecting a guard time at each edge of said MMC time slot portion;

assigning a receive time portion on a second carrier separated from adjacent time slot portions corresponding to said assigned MMC time slot portion by at least one guard space; and assigning a transmit time portion on a carrier separated from adjacent receive slot portions and MMC portions in said frame by at least one guard slot.

14. The invention as defined in claim 13 wherein said MMC time portion is an update for assisting frequency and timing synchronization at the mobile terminal.

15. The invention as defined in claim 13 wherein said satellite communication system comprises a satellite in geostationary orbit.

16. The invention as defined in claim 13 wherein said satellite communication system comprises a satellite in geosynchronous orbit.

17. A mobile terminal to mobile terminal communication system with a plurality of time division multiple access (TDMA) carriers in a geographic coverage area comprising:
- a frame structure including at least one control signal slot, at least one transmit communication slot and at least one receive communication slot,
- a plurality of terminals having DSP capacity for switching between transmit and receive functions and tuning capability for multiple carriers for each at least one transmit communication slot, receive communication slot and control signal slot,
- a communication satellite relaying signals on receive beams and transmit beams between terminals, said relaying introducing delay in transmission to a point on earth, said delay defined as frame offset, and
- time slot assignment plan for spacing said transmit communication slots, receive communication slots and control communication slots relative to each other to achieve up to 100% frame efficiency for a plurality of user terminals located at least one position in said coverage area, said plan including compensation for said frame offset.

18. The invention as defined in claim 17 wherein said system includes a plurality of beams and said at least one position of said user terminals comprises a plurality of positions in one of said beams.

19. The invention as defined in claim 18 wherein said at least one position comprises a plurality of positions in any beam.

20. The invention as defined in claim 17 wherein said at least one position includes relative movement between at least one terminal and said satellite.

21. The invention as defined in claim 17 wherein said compensation comprises creating multiple control signal locations in a frame, and selecting one of said multiple control signal locations depending upon where a selected terminal is located, and assigning said selected one control location to said one frame for said one terminal.

* * * * *